Nov. 14, 1972  K. SHAW  3,702,645
LOADING PLATFORM
Filed Sept. 18, 1970  2 Sheets-Sheet 1

INVENTOR.
KENNETH SHAW
BY
ATTORNEY

Nov. 14, 1972  K. SHAW  3,702,645
LOADING PLATFORM
Filed Sept. 18, 1970  2 Sheets-Sheet 2
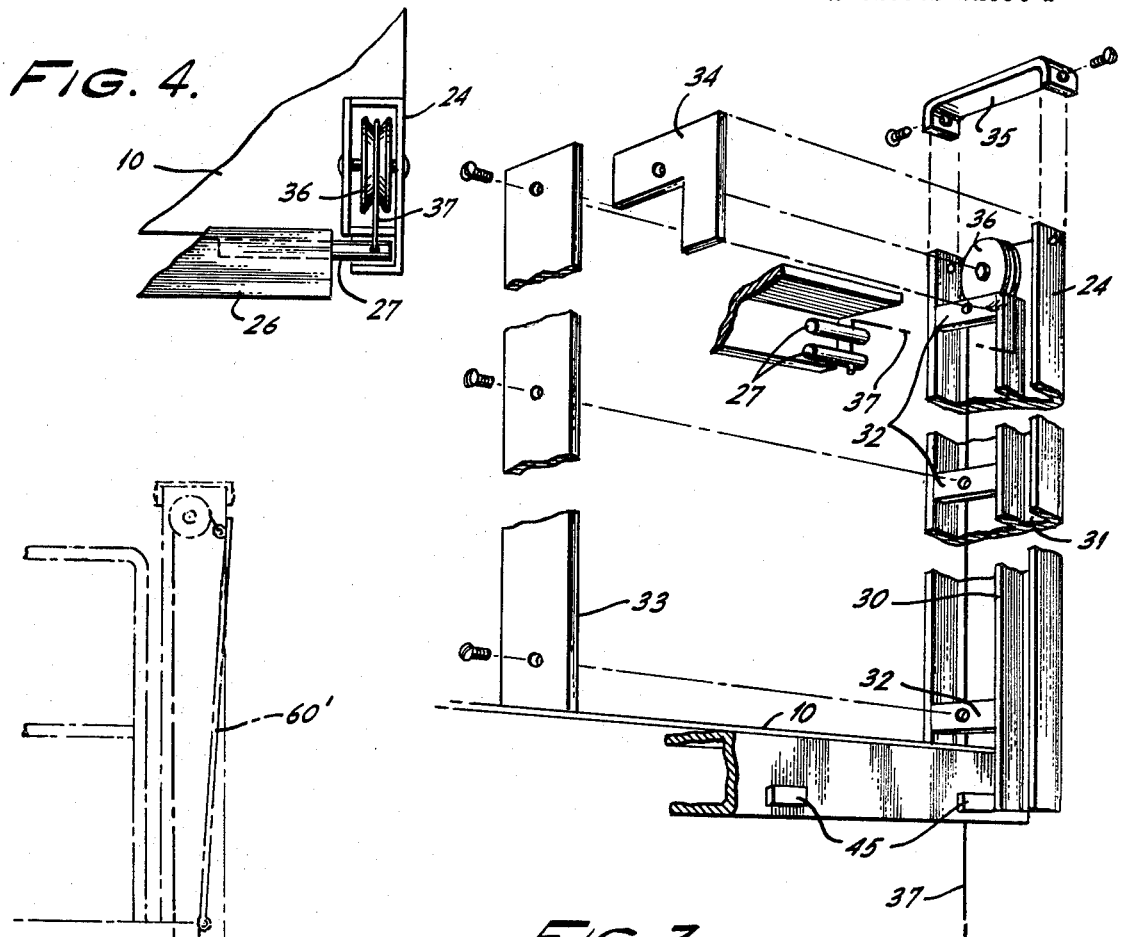
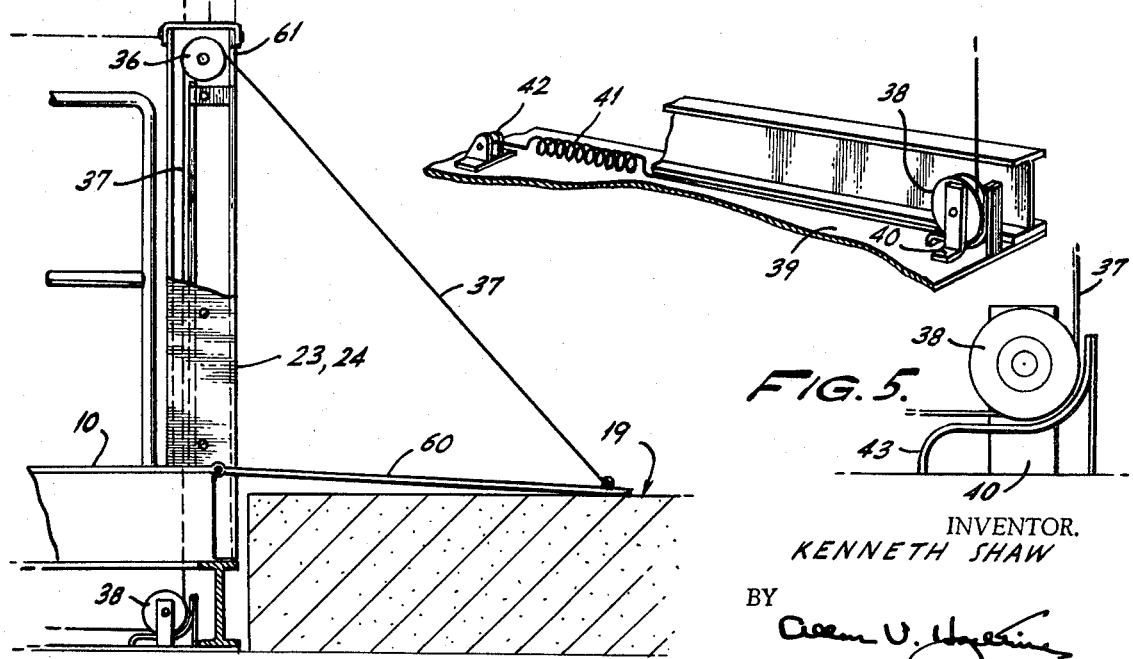
INVENTOR.
KENNETH SHAW
BY
ATTORNEY United States Patent Office 3,702,645
Patented Nov. 14, 1972

3,702,645
LOADING PLATFORM
Kenneth Shaw, Meadowbrook, Pa., assignor to Fred Hill & Son Company, Philadelphia, Pa.
Filed Sept. 18, 1970, Ser. No. 73,459
Int. Cl. B66b 11/04
U.S. Cl. 187—18    3 Claims

ABSTRACT OF THE DISCLOSURE

A loading platform, which is adapted to be raised and lowered to facilitate the transfer of objects from one level to another, is provided with an automatically operable barrier which is raised and lowered in response to raising and lowering of the loading platform to provide protection for personnel when the platform is in its elevated position, while permitting free access to the platform in its lowered position. Also means are provided automatically responsive to the raising and lowering of the platform for positioning a ramp plate for bridging a gap between the platform and an adjacent surface to or from which objects are to be transferred.

---

This invention relates to improvements in loading platforms of the sort which may be raised and lowered to facilitate the transfer of objects from one level to another—as, for example, from a truck bed to a loading dock which is at a lower level. More particularly it relates to automatically operable barriers, responsive to raising and lowering of the loading platform, to prevent personnel and equipment engaged in transferring objects to or from the loading platform from accidentally falling over the edge thereof. Also, it relates to means automatically operable in response to raising and lowering of the platform for positioning a ramp plate for bridging a gap between the platform and an adjacent surface to or from which objects are to be transferred.

It is known to provide loading platforms which can be raised from a position which may be substantially flush with the surface of a loading dock to a level corresponding to that of the bed of a truck to be loaded or unloaded. In operation, objects are moved onto or off the loading platform from or to the truck bed from one end of the loading platform using conventional hand trucks. When the loading platform has been filled it is lowered to the level of the dock and then is unloaded from the opposite end. It has been customary to provide suitable guard rails along the sides of the loading platform, but normally the end opposite that which faces the truck to be loaded or unloaded has been left unguarded, as a result of which it has not been unusual for workers, whose attention is mainly directed to loading or unloading operations, to step off the unprotected end of the platform, frequently together with a loaded hand truck, as a result of which many serious injuries have resulted. Even if some barrier were provided which could be placed across the exposed end of the platform by the personnel using it, it hardly could be expected that it would always be used because of the inconvenience involved in doing so and the normal tendency of personnel to overlook or forget such matters. Accordingly, there is a real need for a simple and reliable means for automatically positioning a barrier across the exposed end of the platform whenever the platform is raised, and for automatically removing such barrier when the platform is lowered to permit free access to that end of the platform.

It is an object of the invention to provide simple and reliable means for automatically positioning a barrier across the exposed end of a loading platform whenever the platform is raised, and for automatically removing the barrier when the platform is lowered.

It is a further object of the invention to provide such a barrier which also serves, when the loading platform is in its lowered position, as a ramp providing convenient access between the loading platform and a surface below the level of said platform in situations where the platform, in its lower position, is not flush with the surface of an unloading dock.

Yet a further object of the invention is to provide ramp plates hinged to the edge of the loading platform at the end adjacent the bed of the truck to be loaded or unloaded which, as the platform is raised, are automatically positioned to bridge any gap between the platform and the truck bed, and which, while the platform is being raised, are positioned substantially vertically to serve the additional function of a barrier at the end of the platform at which they are located.

The manner in which these objectives are achieved will be apparent from consideration of the detailed description of the invention with reference to the appended drawings in which:

FIG. 3 is an exploded view showing further details of the embodiment of FIGS. 1 and 2;

FIG. 4 is a detail view of a portion of the apparatus of FIG. 3;

FIG. 5 is a further detail view of the lower pulley and guard assembly shown in FIG. 3; and FIG. 6 shows an alternative embodiment of the invention.

Figure 1:
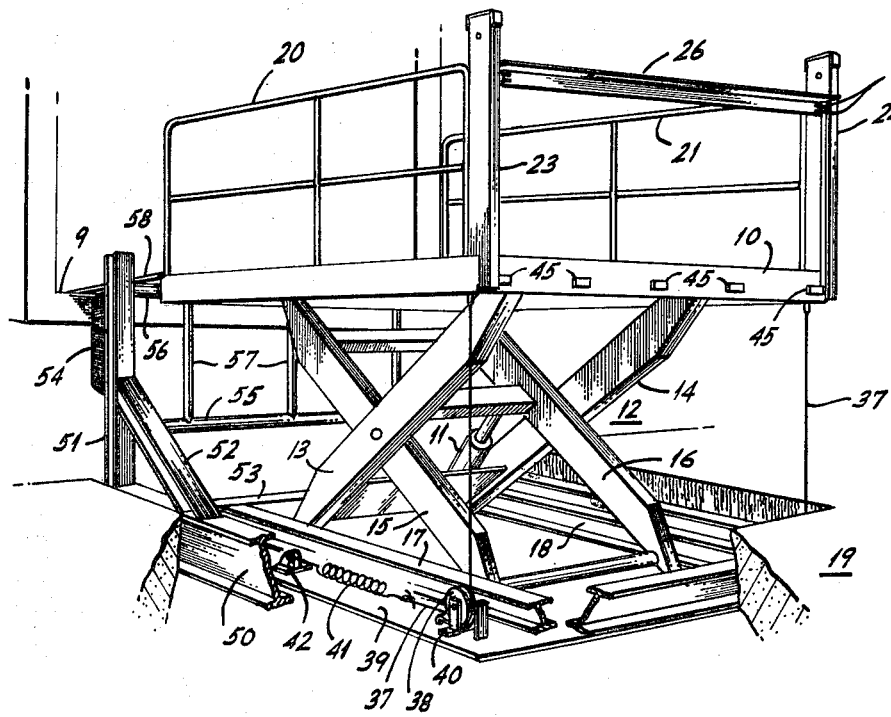
FIG. 1 is a perspective view showing the general organization of one embodiment of the invention.

Referring now to FIG. 1, there is shown a loading platform 10 provided with an elevator mechanism 12 comprising arms 13, 14, 15 and 16 equipped with hydraulic cylinders 11 for raising and lowering platform 10 between the level of a loading dock 19 and an upper level corresponding to the bed 9 of a truck to be loaded or unloaded. The lower ends of arms 13 and 14 may be pivoted on pivots affixed to channels 17 and 18 which in turn are fastened to base plate 39. The upper ends of arms 15 and 16 likewise may be pivoted on pivots affixed to the under side of platform 10. The upper ends of arms 13 and 14 and the lower ends of arms 15 and 16 may be provided with rollers (not shown) free to roll in tracks affixed respectivey to baseplate 39 and the underside of platform 10. The lower tracks may be formed by the channels in I-beams 17 and 18. In operation platform 10 is raised to an upper position corresponding substantially to the level of the truck bed 9 to facilitate transfer of objects from the bed of the truck to platform 10. When platform 10 has been loaded, it is lowered to the level of loading dock 19 and the objects may then be readily moved off the platform onto the loading dock using conventional hand trucks. Customarily a loading platform of this sort is provided with side guard rails 20 and 21, but its ends are left open to permit free access to and from the bed of a truck to be loaded or unloaded and free access at the other end to the loading dock.

In accordance with the present invention platform 10 is provided with corner posts 23 and 24 having their lower ends firmly fastened to the loading platform by welding or in any other suitable manner. Posts 23 and 24 conveniently may comprise formed steel channel members shown at 24 in FIG. 3, and each such channel member may be provided with a central divider 30 welded thereto forming a relatively narrow channel portion 31 for receiving the outer ends of pins 27 whose inner ends may be welded to the inner vertical surface of an L-sectioned member 26 extending between corner posts 23 and 24 and forming a barrier movable up and down in channels 31 in corner posts 23 and 24 as shown in detail in FIG. 4. Divider 30 may be spaced from the edges of the channel member by spacers 32 welded in place at several points along the length of channel member 24. The inwardly facing sides of the channel members comprising corner posts 23 and 24 may be provided with suitable cover plates 33 and 34, the former being fastened to spacers 32 by screws (not shown) and the latter by welding to channels 23 and 24. Plate 34 includes a downwardly extending L-shaped portion adapted to limit the upward motion of the pins 27 affixed to barrier 26. The upper ends of corner posts 23 and 24 may be provided with protective caps 35. Mounted at the upper end of each of corner posts 23 and 24 is a sheave 36 free to turn on an axle supported by the corner posts and cover plate 34. The projecting ends of pins 27 on barrier 26 are provided with vertical holes for receiving the ends of flexible wire cables 37 which are secured therein by conventional cable clamps on their ends. Each cable 37 then passes over sheave 36 and down through the wider channel in corner post 24 to a second sheave 38 mounted and free to rotate on a bracket 40 affixed to base plate 39. The other end of cable 37 is affixed to the end of a spring 41 whose opposite end is anchored to a bracket 42 also affixed to base plate 39.

As shown in the detail drawing of FIG. 5, bracket 40 is provided with a guard 43 formed to prevent cable 37 from jumping off sheave 38. The length of cable 37 is made such that, when platform 10 is in its lowermost position, L-shaped barrier 26 will rest with its lower portion on stop blocks 45 welded to the end of platform 10 and with its upper horizontal surface substantially flush with the surface of platform 10 so as to bridge any gap between platform 10 and the loading platform. When platform 10 is elevated, tension is applied to cables 37 to raise barrier 26 as the platform rises until pins 27 contact the lower edge of cover plates 34 and stop the upward movement of barrier 26. In this position barrier 26 provides suitable protection to personnel loading or unloading platform 10 in its elevated position, while in its lowered position, when platform 10 is lowered, it permits free access between platform 10 and loading dock 19. Since the vertical distance traversed by loading platform 10 may be greater than that traversed by barrier 26, provision is made for accommodating this difference by providing the relatively stiff coil spring 41 in the connection from the lower end of cables 37 to anchor bracket 42. Spring 41 typically may be of the sort commonly used on garage door mechanisms—i.e., of about 75 pounds pull. It will be noted that even if barrier 26, as it descends, should come into contact with personnel working on the unloading platform 10, no injury is likely to occur because only the weight of the barrier 26 itself is involved in tending to force the barrier downward, which in general will be insufficient to cause any injury or even discomfort. Although the details of but one of the two corner posts 23, 24 and its associated mechanism have been described, it will be understood that the other may be identical.

Figure 2:
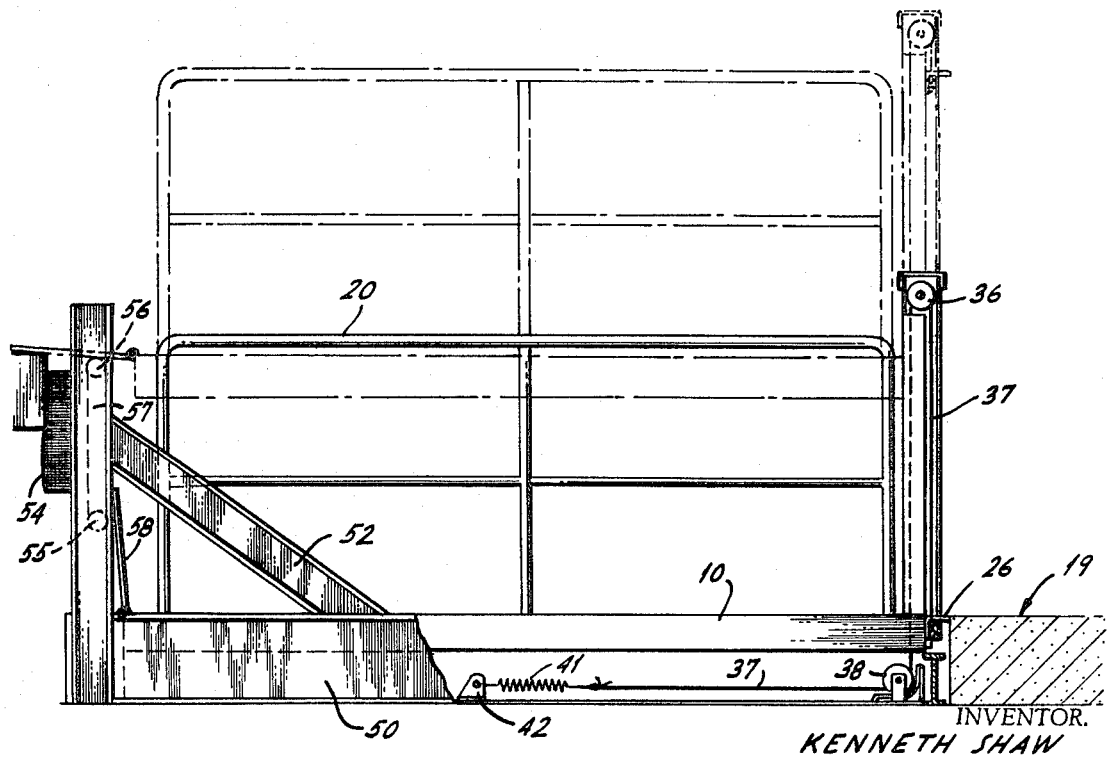
FIG. 2 is a side elevation of the embodiment of FIG. 1 showing further details and the mode of operation in accordance with the invention.

Referring again to FIGS. 1 and 2, on either side of platform 10 and its associated elevating mechanism 12 are positioned heavy steel frames fabricated from steel I-beams, each of which may comprise a longitudinal member 50 extending along each side of the loading platform, a vertical member 51 positioned at the ends thereof nearest the position occupied by the truck to be unloaded, and a diagonal brace member 52. The two frames, one on each side of the loading platform, are joined at their ends by I-beam cross members 53. Also joining the upright members 51 is a frame comprising cross members 55 and 56, which may be of pipe or tubing, and vertical members 57 interconnecting the lower and upper horizontal members 55 and 56. The latter may be of angle iron with their outside corners facing toward the back edge of the loading platform 10. Each of the vertical members 51 may be provided with a heavy rubber or other suitable bumper 54 for intercepting the back end of a truck as it is backed against the frame members.

Hinged to the back end of platform 10 are one or a plurality of plates 58 positioned so that, as platform 10 rises from its lowermost position, the outer edge of the plate or plates engages vertical members 57, the plate or plates 58 occupying a substantially vertical position and providing a barrier at the back end of the platform 10. The upper cross member 56 extending between upright members 51 is so positioned that, as platform 10 reaches the upper limit of its travel, plate or plates 58 will swing outward and downward onto the bed 9 of a truck and will afford a ramp bridging the gap between platform 10 and the truck bed. When platform 10 is lowered, plate or plates 58 will automatically be lifted back into their substantially horizontal position through the action of cross member 56 as platform 10 proceeds downward. Thus there is provided a loading ramp which is automatically positioned between the loading platform and the truck bed as platform 10 rises into position for loading or unloading a truck, and which also serves as a protective barrier on the unloading platform 10 at the end thereof adjacent the truck while the platform is rising into its elevated position of being lowered therefrom.

Referring now to FIG. 6, which shows an alternative form of the invention, in this embodiment the barrier 26 of the embodiment of FIG. 1 is replaced by a ramp plate 60 hinged at its inner edge to the edge of platform 10 and adapted to be swung from a horizontal position in the lowermost position of platform 10 to a vertical position 60' in the raised position of platform 10. Such motion is accomplished automatically with the raising and lowering of platform 10 through a cable arrangement similar to that used in the embodiment of FIG. 1 except that one end of each cable 37, instead of being connected to the horizontal barrier 26, extends through a slot 61 in the face of one of the corner posts 23, 24, and is secured to a point near the outer edge of ramp plate 60. In its lowered position, ramp plate 60 may assume a position other than horizontal, as shown, to accommodate any difference in level between platform 10 in its lowered position and the level of loading dock 19. It will be seen that the construction and mode of operation is otherwise very similar to that of the embodiment of FIG. 1.

While the invention has been described with reference to two specific embodiments thereof, it will be understood that changes may be made and other embodiments may be constructed without departing from the scope of the invention as defined by the following claims.

What is claimed is:

1. A load transfer system for fixed installation in a loading dock for use in transfer of cargo between a truck bed and a lower-level loading dock, comprising, in combination:

(a) a rectangular elevatable loading platform;

(b) power actuating means for raising and lowering said platform between predetermined limits, the loading platform in its lower position being substantially flush with the surface of said loading dock and being elevatable to substantially equal the height of a truckbed, and said power actuating means being recessed in said loading dock substantially beneath said loading platform and including scissor linkage means for keeping said platform substantially level as it is raised and lowered;

(c) a plate hinged at one edge to one end of said loading platform and arranged to swing from a ramp position when said platform is in its lower state to a substantially vertical protective wall position as the platform is being elevated toward the truck bed level;

(d) corner posts extending upward from the two corners of said platform at said one end thereof; and (e) means for automatically moving said plate from said first to said second position in response to raising of said platform and from said second to said first position in response to lowering of said platform, said means comprising two cables, each cable having one end attached to said plate and having its other end attached to one end of a tension spring, the opposite end of which is anchored to a fixed anchorage with respect to the loading dock, and a sheave stationed in each of said two corner posts, each of said sheaves being interposed in the path of a respective one of said two cables intermediate the spring-connected end thereof and the opposite cable end connected to a respective side of said plate, whereby the raising of said platform and the resultant upward movement of the sheaves in the corner posts pulls the plate up into a protective barrier position and thenceforth extends the springs as the platform approaches truck bed level, whereby the person who transfers cargo between the interior of the truck and the elevated loading platform is protected from backing over the outer end of the loading platform.

2. A load transfer system as defined in claim 1, further including: a pair of stationary upright standards adjacent the corners of said rectangular loading platform opposite to said corner posts to define the limiting position for the rear end of a truck preparatory to cargo transfer, a ramp plate hinged to the end of said platform opposite said one end thereof, said ramp plate, when substantially horizontal, just bridging over the space from said elevatable loading platform to an adjacent truck-bed between said upright standards, and guide means fixedly supported between said upright standards for engaging said ramp plate and tilting it up to an inclined position when the platform is proceeding downward and retaining it in inclined position until the platform returns to approximately the level of the truck-bed, said ramp plate providing a further protective wall for cargo and operating personnel.

3. A load transfer system for fixed installation in a loading dock for use in transfer of cargo between a truck bed and a lower-level loading dock, comprising, in combination:

(a) a rectangular elevatable loading platform;

(b) power actuating means for raising and lowering said platform between predetermined limits, the loading platform in its lower position being substantially flush with the surface of said loading dock and being elevatable to substantially equal the height of a truck-bed, and said power actuating means being recessed in said loading dock substantially beneath said loading platform and including scissor linkage means for keeping said platform substantially level as it is raised and lowered;

(c) corner posts extending upward from the two corners of said platform at said one end thereof, each of said corner posts including a sheave supported therein;

(d) a movable protective barrier at said one end of said platform, said movable barrier being arranged to be moved between a first position at substantially the same height as said platform and a second position wherein said barrier affords protection in the space between said corner posts at an elevation substantially above the surface of said platform;

(e) means for automatically moving said barrier from said first to said second position in response to raising of said platform and from said second to said first position in response to lowering of said platform, said means comprising two cables, each cable having one end attached to said movable barrier and having its other end attached to a tension spring, the opposite end of which is anchored to a fixed anchorage with respect to the loading dock, each of said sheaves in said corner posts being interposed in the path of a respective one of said two cables intermediate the spring-connected end thereof and the opposite cable end connected to a respective end of said movable barrier, whereby the raising of said platform and the resultant upward movement of the sheaves in the corner posts pulls the barrier up into its protective position and thenceforth extends the springs as said platform approaches truck bed level, whereby the person who transfers cargo between the interior of the truck and the elevated loading platform is protected from backing over the outer end of the loading platform, said movable protective barrier comprising a horizontal member extending between said corner posts and guided thereby, said load transfer system further including a pair of stationary upright standards adjacent the corners of said rectangular loading platform opposite to said corner posts to define the limiting position for the rear end of a truck preparatory to cargo transfer, a ramp plate hinged to the end of said platform opposite said one end thereof, said ramp plate, when substantially horizontal, just bridging over the space from said elevatable loading platform to an adjacent truck-bed between said upright standards, and guide means fixedly supported between said upright standards for engaging said ramp plate and tilting it up to an inclined position when the platform is proceeding downward and retaining it in inclined position until the platform returns to approximately the level of the truck-bed, said ramp plate providing a further protective wall for cargo and operating personnel.

References Cited

UNITED STATES PATENTS

| 1,201,316 | 10/1916 | Lindholm | 187—62 |
| 1,529,122 | 3/1925 | Fischer | 187—58 |
| 3,521,775 | 7/1970 | Vermette | 187—9 |

HARVEY C. HORNSBY, Primary Examiner

U.S. Cl. X.R.

187—1 R, 51, 58; 268—46